(12) United States Patent
Seo et al.

(10) Patent No.: US 7,883,751 B2
(45) Date of Patent: *Feb. 8, 2011

(54) LIQUID CRYSTAL DISPLAY AND METHOD FOR MANUFACTURING THE SAME

(75) Inventors: Hyeon Jin Seo, Gyeongsangbuk-do (KR); Dhang Kwon, Daejeon-si (KR); Hang Sup Cho, Gyeongsangbuk-do (KR); Ho Su Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 197 days.

This patent is subject to a terminal disclaimer.

(21) Appl. No.: 12/232,890

(22) Filed: Sep. 25, 2008

(65) Prior Publication Data

US 2009/0086152 A1    Apr. 2, 2009

(30) Foreign Application Priority Data

Oct. 1, 2007   (KR) ...................... 10-2007-0098694

(51) Int. Cl.
*C09K 19/00*   (2006.01)
*C09K 19/06*   (2006.01)
*C09K 19/52*   (2006.01)
*G02F 1/1333*  (2006.01)

(52) U.S. Cl. ........................ 428/1.1; 349/155; 349/187; 252/299.01; 430/20

(58) Field of Classification Search ................. 349/155, 349/187; 430/20; 428/1.1; 252/299.01
See application file for complete search history.

(56) References Cited

U.S. PATENT DOCUMENTS

| 2009/0079916 A1* | 3/2009 | Kim et al. .................... 349/106 |
| 2009/0091677 A1* | 4/2009 | Cho et al. ..................... 349/46 |
| 2009/0091702 A1* | 4/2009 | Kim et al. ................... 349/155 |

* cited by examiner

*Primary Examiner*—Geraldina Visconti
(74) *Attorney, Agent, or Firm*—Morgan, Lewis & Bockius LLP

(57) ABSTRACT

Disclosed herein are a liquid crystal display (LCD) device and a method for manufacturing the same, wherein ball spacers are fixedly used to reduce touch and press defects and the content of a solid mixed with balls is increased to partially widen an area of the upper surface of the spacer to thereby prevent damage of the substrate that faces the spacer or of the structure provided on the same. The liquid crystal display device includes a first substrate and a second substrate facing each other, a gate line and a data line formed on the first substrate such that the gate line and the data line intersect each other to define a pixel region, a black matrix layer formed on the second substrate in a portion corresponding to the gate line and the data line, a spacer formed on the first substrate or the second substrate in a predetermined portion provided within the black matrix layer, the spacer comprising a plurality of balls and a solid to aggregate the balls together and cover the surfaces of the balls, and a liquid crystal layer filled between the first substrate and the second substrate.

14 Claims, 11 Drawing Sheets

LIQUID CRYSTAL DISPLAY AND METHOD FOR MANUFACTURING THE SAME

This application claims the benefit of Korean Patent Application No. 2007-098694, filed on Oct. 1, 2007, which is hereby incorporated by reference as if fully set forth herein.

BACKGROUND OF THE INVENTION

1. Field of the Invention

The present invention relates to a liquid crystal display (LCD) device. More particularly, the present invention relates to a liquid crystal display (LCD) device and a method for manufacturing the same, wherein ball spacers are fixedly used to reduce touch and press defects, and the content of a solid mixed with balls is increased to partially widen an area of the upper surface of the spacer to thereby prevent damage of the substrate that faces the spacer or of the structure provided on the same.

2. Discussion of the Related Art

With the progress of information-dependent society, the demand for various display devices has increased. To meet such a demand, efforts have recently been made to research flat panel display devices such as liquid crystal displays (LCDs), plasma display panels (PDPs), electro-luminescent displays (ELDs) and vacuum fluorescent displays (VFDs). Some types of such flat panel displays are being practically applied to various appliances for display purposes.

Of these, LCDs are currently most widely used as substitutes for cathode ray tubes (CRTs) in association with mobile image display devices because LCDs have advantages of superior picture quality, lightness, slimness, and low power consumption. Various applications of LCDs are being developed in association with not only mobile image display devices such as monitors of notebook computers, but also monitors of TVs to receive and display broadcast signals, and monitors of laptop computers.

Successful application of such LCDs to diverse image display devices depends on whether or not the LCDs can realize desired high picture quality including high resolution, high brightness, large display area, and the like, while maintaining desired characteristics of lightness, slimness and low power consumption.

Hereinafter, the structure of a conventional LCD device will be described with reference to the annexed drawings.

FIG. 1 is a plan view illustrating a conventional LCD device comprising a column spacer.

As shown in FIG. 1, a conventional LCD array region comprises gate lines 4 and data lines (not shown) that intersect each other to define pixel regions, thin film transistors (TFT) formed at respective intersections between the gate lines 4 and the data lines, and pixel electrodes 6 formed in the respective pixel regions. The array region further comprises column spacers 20 uniformly spaced apart from one another, to maintain a cell gap.

As shown in FIG. 1, each column spacer 20 is arranged in a region provided above the gate line 4. That is, the gate line 4 is arranged on a first substrate 1, a gate insulating film 15 is arranged over the entire surface of the first substrate 1 including the gate line 4, and a passivation film 16 is arranged on the gate insulating film 15.

Meanwhile, a black matrix layer 7 to shield non-pixel regions (i.e., portions where the gate lines and the data lines and the thin film transistors are formed) other than pixel regions is formed on the second substrate 2. In addition, a color filter layer comprising R, G and B color filters arranged at respective pixel regions is formed on the second substrate 2 including the black matrix layer 7, and a common electrode 14 is formed over the entire surface of the second substrate 2 including the color filter layer 8.

The column spacers 20 are formed on portions of the common electrode 14 corresponding to the gate lines 4. Accordingly, the first and second substrates 1 and 2 are joined together such that the column spacers 20 are arranged on the gate lines 4.

The column spacers 20 are formed in an array process performed on the first substrate 1 or the second substrate 2. The column spacers 20 are fixedly formed in the form of columns with a certain height on the predetermined substrate.

The column spacers 20 are fixed to specific positions and thus do not move when liquid crystals are dropped to form a liquid crystal layer. Advantageously, the column spacers do not inhibit the liquid crystals from flowing. However, the column spacers have a large area in contact with the corresponding substrate, thus disadvantageously causing display defects, e.g., touch defects.

Hereinafter, problems associated with LCDs employing ball spacers instead of column spacers will be illustrated.

FIG. 2 is a sectional view illustrating movement of a ball spacer. FIG. 3 is a sectional view illustrating a problem in which an alignment film arranged on a substrate that faces a ball spacer is damaged by movement of the ball spacer.

As shown in FIG. 2, in the liquid crystal display device using the ball spacer, the ball spacer 55 is arranged on the outermost surface of the structure including a black matrix layer 51, a color filter layer 52, an overcoat layer 53 and an alignment film 54 arranged on a second substrate 50 in this order.

The ball spacer 55 is dispersedly formed in a desired position on the second substrate 50 or the first substrate (not shown). Disadvantageously, the ball spacer 55 rolls on the substrate, where it is dispersed, due to its shape. Although formed in the desired position, the ball spacer 55 comes out of the position due to external force applied during the manufacturing process or impact applied in use, thus disadvantageously causing light leakage. That is, when the ball spacer 55 deviates from the original position, it comes out of the portion provided above the black matrix layer 51 and rolls toward the side of the portion. At this time, a height difference between the top of the ball spacer 55 which is arranged in the initial position, and the top of the ball spacer 55 which is arranged in the final position occurs, which is substantially comparable to the thickness of the black matrix layer 51. Such a height difference may cause variation in cell gap after the ball movement. In addition, the height difference involves problems in that an aperture ratio is decreased due to the ball spacer 55 arranged out of regions provided by the black matrix layer, and scattering occurs on the surface of the ball spacer 55 which moves into a pixel region. Furthermore, the ball spacer 55 arranged in the pixel region results in distorted orientation of liquid crystals, thus causing light leakage. In particular, a phenomenon in which light leakage is concentrated in a specific region due to the movement of the ball spacer is referred to as a "galaxy defect".

In addition, as shown in FIG. 3, the structure provided on the second substrate 50 comprising the ball spacer 55 of FIG. 2 is reversed and faces the structure provided on the first substrate 60 to join the second substrate 50 to the first substrate 60.

The structure provided on the first substrate 60 comprises: a gate line 61 arranged in one direction; a gate insulating film 62 formed on the first substrate 60 including the gate line 61; a data line (not shown) formed on the gate insulating film such that the data line crosses the gate line 61 to define a pixel region; a passivation film 63 on the gate insulating film 62 including the data line; and a first alignment film 64 formed over the entire surface of the passivation film 63.

In addition, the movement of the ball spacer 55 may cause damage (e.g., tearing or rubbing distortion) to the surface of the second alignment film 64 that comes in contact with the ball spacer 55 in a dot-like area.

LCDs employing the afore-mentioned conventional ball spacers suffer from the following problems.

First, when column spacers are employed, they have a large area in contact with the substrate that faces the column spacers. For this reason, when a frictional force is applied to the column spacers by touch operations, the column spacers take a long time to return to their original state after they are pushed in one direction. Upon returning, display defects occur.

Second, when ball spacers are used instead of the column spacers in order to solve the problems such as touch defects, they tend to roll into pixel regions due to their mobility, causing additional defects e.g., display defects.

Third, when the ball spacer formed in only a specific local region is moved by an applied external impact, it passes a specific portion, while concentrically scratching the same, thus causing damage to the outermost surface (i.e., the alignment film) of the structure provided on the substrate that faces the ball spacer.

SUMMARY OF THE INVENTION

Accordingly, the present invention is directed to a liquid crystal display (LCD) device and a method for manufacturing the same that substantially obviate one or more problems due to limitations and disadvantages of the related art.

An object of the present invention is to provide a liquid crystal display (LCD) device and a method for manufacturing the same, wherein ball spacers are fixedly used to reduce touch and press defects and the content of a solid mixed with balls is increased to partially widen an area of the upper surface of the spacer to thereby prevent damage of the substrate that faces the spacer or of the structure provided on the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises: a first substrate and a second substrate facing each other; a gate line and a data line formed on the first substrate such that the gate line and the data line intersect each other to define a pixel region; a black matrix layer formed on the second substrate in a portion corresponding to the gate line and the data line; a spacer formed on the first substrate or the second substrate in a predetermined portion provided within the black matrix layer, the spacer comprising a plurality of balls and a solid to aggregate the balls together and cover the surfaces of the balls; and a liquid crystal layer filled between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, an LCD device and a method for manufacturing the same according to the present invention will be described with reference to the annexed drawings.

In an attempt to solve the problems associated with the high mobility of the afore-mentioned conventional ball spacer formed in accordance with the dispersion method, an ink-jetting method in which ball spacers are fixedly formed has been suggested.

However, it was reported that ball spacers formed by the ink-jetting method also move in the space between the two substrates due to an applied external impact. Accordingly, a method wherein an additional component to improve the adhesion force, together with balls, is further added to a spacer-forming material to form a spacer, has been designed.

An LCD device and a method for manufacturing the same according to the present invention will be described with reference to FIGS. 4A and 4B.

Figure 4A:
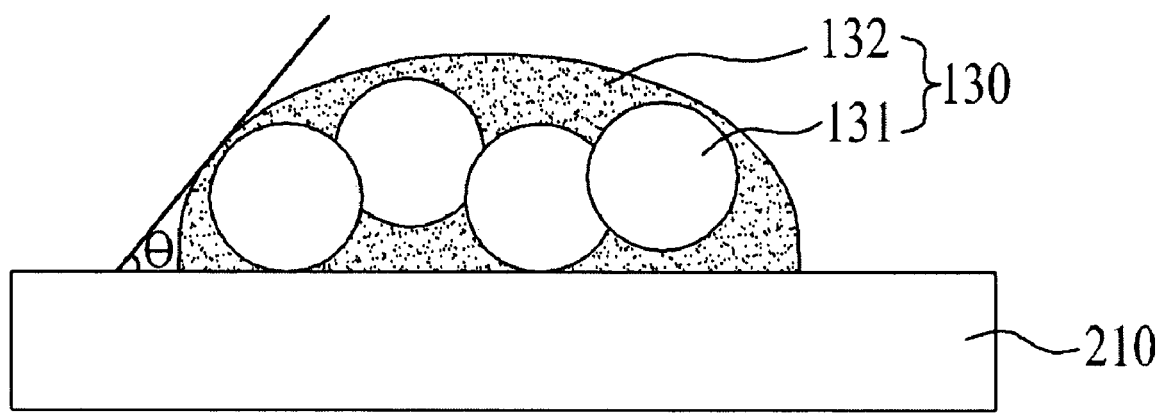
FIGS. 4A and 4B are sectional views illustrating an area where a spacer comes in contact with a substrate that faces the same in a liquid crystal display device according to a first embodiment of the present invention.
Figure 4B:
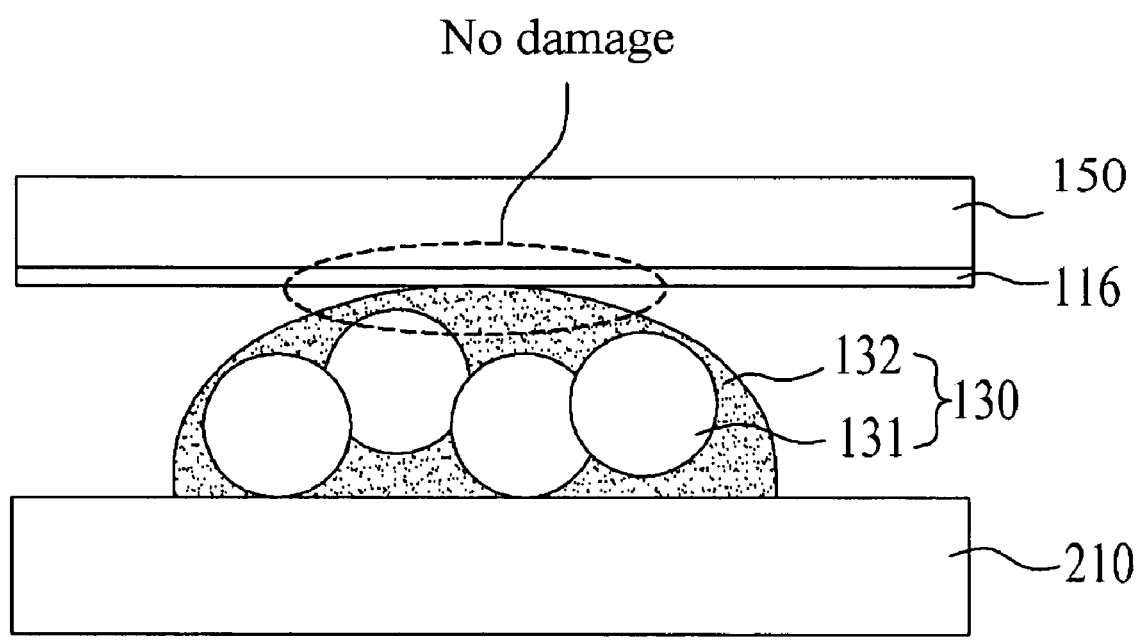

FIGS. 4A and 4B are sectional views illustrating an area where a spacer comes in contact with a substrate that faces the same in a liquid crystal display device according to a first embodiment of the present invention.

As shown in FIG. 4A, in the liquid crystal display device of the first embodiment, a spacer 130 is formed on a color filter substrate 210 including a color filter array (that comprises a black matrix layer, a color filter layer, an overcoat layer or a common electrode, and an alignment film), wherein the spacer comprises a plurality of balls 131 and a solid 132 to aggregate the balls 131 and to fix the balls 131 in the form of an oblate spheroid on the color filter substrate 210.

The spacer 130 is formed in accordance with an ink-jetting method, which is performed by jetting a spacer-forming material from an inkjet head (not shown) containing the same in a predetermined position. The spacer-forming material comprises: a liquid material consisting of 3 to 30 wt % of a liquid thermosetting binder and the remaining weight of a solvent; and 0.1 to 3 wt % of the balls, with respect to 100 wt % of the total weight of the liquid material.

In the process of curing the thermosetting binder into the solid 132, the solvent contained in the spacer-forming material is finally volatilized and removed.

Since the solid 132 is present in a higher amount than the balls 131, it has an adhesion force to aggregate the balls 131 in one jetting region and prevent the balls 131 contained therein from being dispersed. In this case, the balls 131 are not stacked in the form of a laminate, instead being spread over the color filter substrate 210 in the form of a monolayer. In such a configuration, the surface of the spacer 130 comes in contact with the color filter substrate 210 at an angle θ of about 20 to 50 degrees.

The flatness of the top of the spacer 130 is determined depending on the contact angle between the spacer 130 and the color filter substrate 210, at which the spacer-forming material is ink-jetted, the solid content and drop size upon ink-jetting. In a predetermined amount of solid, as the contact angle increases, the drop size decreases and the top contact surface becomes narrower. In a high amount of solid, the drop size decreases, but the top contact surface increases. In some cases, although the contact angle is low i.e., about 20 to about 50 degrees, when the solid content is low, the top of respective balls is exposed and the contact area is thus low, thus causing deterioration in flatness. Accordingly, the solid 132 is present in a sufficient amount so that it can cover the surfaces of the plurality of balls.

That is, the spacer 130 of the liquid crystal display device has the top including the surfaces of the balls 131, which secures considerable flatness due to the high content of the solid, thus coming in contact with the substrate (thin film transistor substrate) that faces the spacer 130 in an area not smaller than a predetermined level, and preventing damage to the substrate that faces the balls 131. As a result, bright spot defects or galaxy defects caused when the balls 131 scratch the opposite substrate can be prevented.

Figure 1:
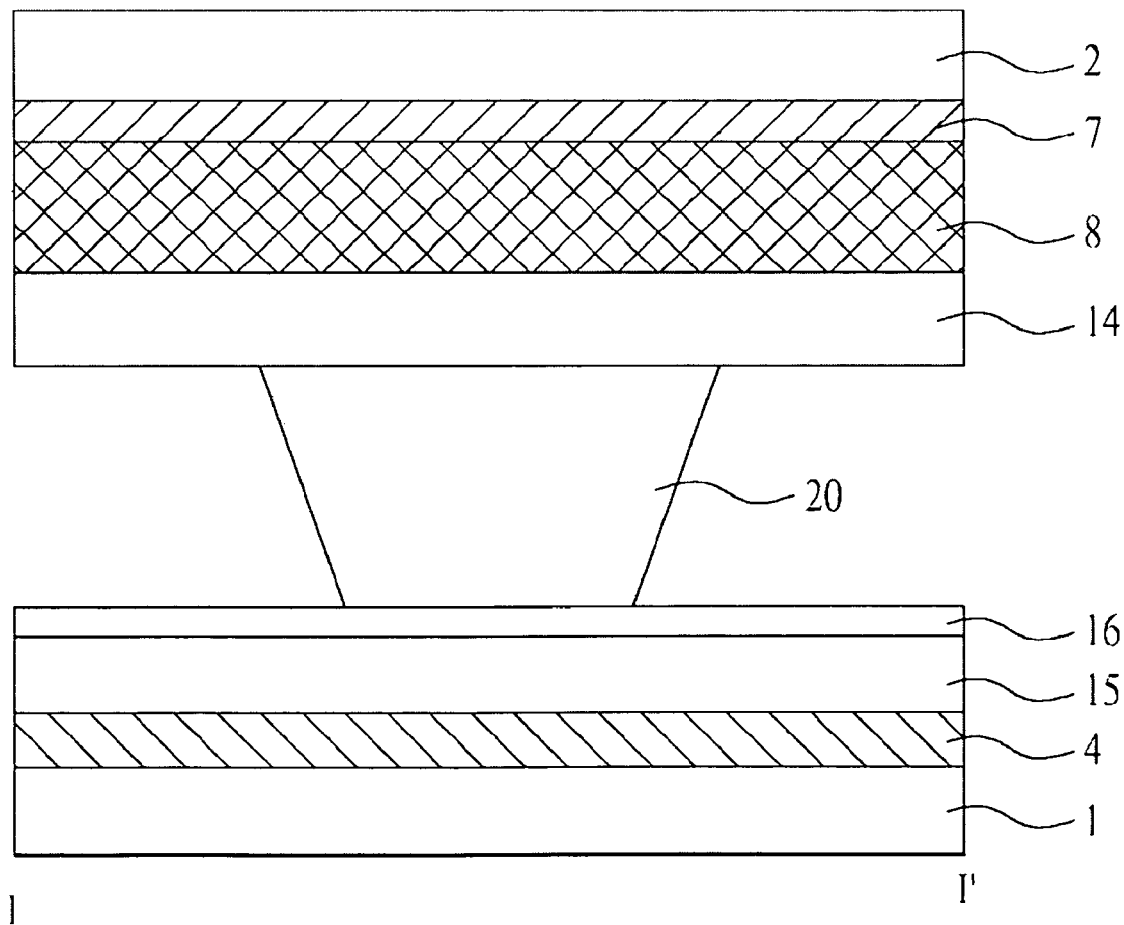
FIG. 1 is a plan view illustrating a conventional liquid crystal display device.
Figure 2:
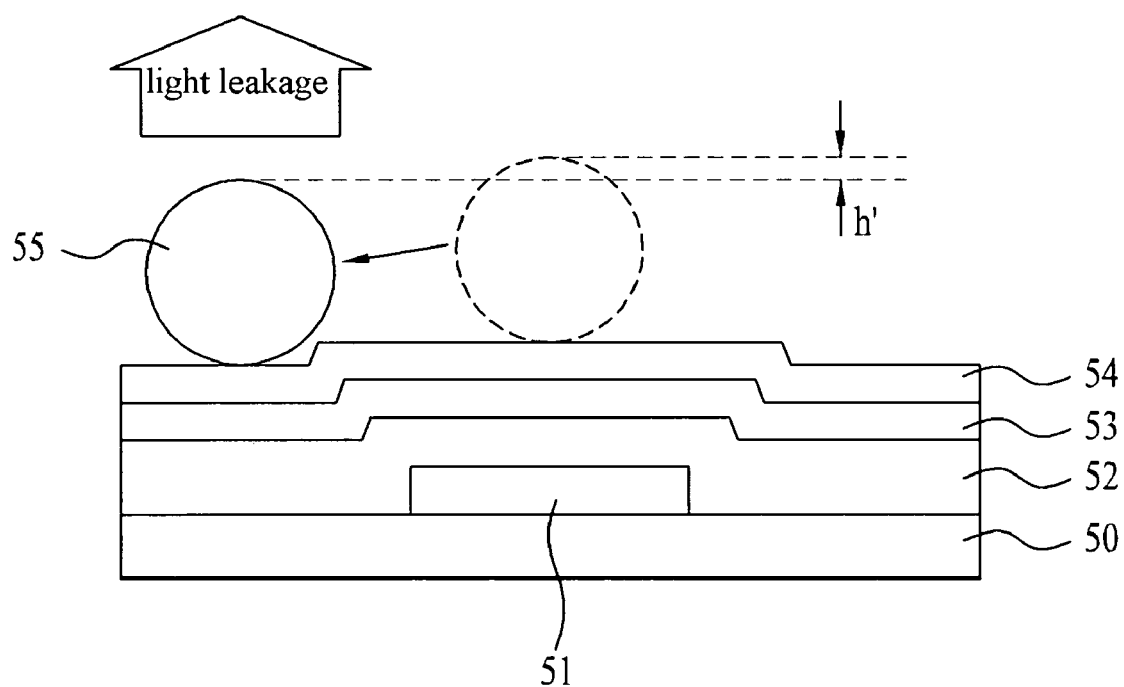
FIG. 2 is a sectional view illustrating movement of a ball spacer.
Figure 3:
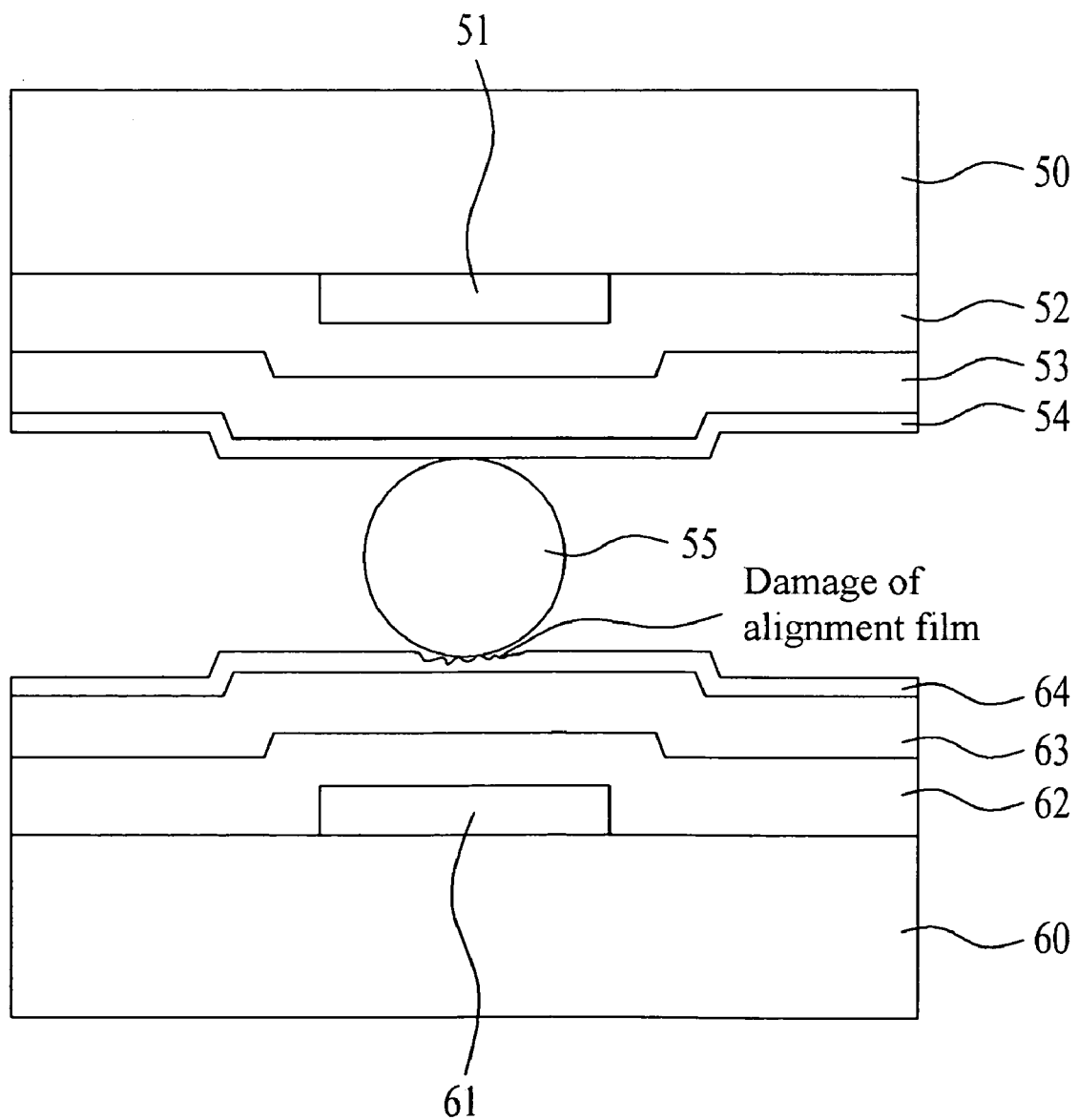
FIG. 3 is a sectional view illustrating a problem in which an alignment film arranged on a substrate that faces a ball spacer is damaged by movement of the ball spacer.

In addition, as shown in FIG. 4B, the spacer 130 formed on the color filter substrate 210 faces and comes in contact with the alignment film 116 formed over the entire surface of the thin film transistor substrate 150. When compared to spherical ball spacers (See FIGS. 2 and 3), the oblate spheroidal ball spacer 130 comes in contact with the alignment film 116 not in a dot-like area, but in a small area, thus preventing damage of the alignment film which occurs when the ball spacer comes in contact with the opposite substrate in a dot area. That is, the top of the spacer 130 is partially planarized, and the force applied to the spacer 130 is dispersed and damage to the alignment film due to concentrated force can thus be prevented.

In the process of ink-jetting, such a spacer-forming material including the plurality of balls is jetted in the corresponding region and then cured at about 80 to 300° C. As a result, the liquid thermosetting binder is cured and then becomes a solid to aggregate the balls 131 and adhere the balls 131 to the substrate, while the solvent is volatilized.

The solid is an uncured form of the liquid thermosetting binder. For example, the solid includes at least one selected from acrylic-based, urethane-based, epoxy-based organic compounds or silicone compounds. Specific examples of acrylic compounds may include ethyl methacrylate, N-butyl methacrylate, isobutyl methacrylate, dicyclopentanyl methacrylate, benzyl methacrylate, glycidyl methacrylate, 2-hydroxyethyl methacrylate, methacrylic acid isobornyl methacrylate and styrene polymers, and combinations thereof.

The solvent is selected from those that have a boiling point of 60 to 300° C. For example, glycolether may be used as the solvent. Examples of useful glycol ethers include propylene glycol methyl ether (PGME), dipropylene glycol methyl ether (DGME), tripropylene glycol methyl ether (TGME), propylene glycol methyl ether acetate (PGMEA), dipropylene glycol methyl ether acetate (DGMEA), propylene glycol n-propyl ether (PGPE), dipropylene glycol n-propyl ether (DGPE), propylene glycol n-butyl ether (PGBE), dipropylene glycol n-butyl ether (DGBE), tripropylene glycol n-butyl ether (TGBE), propylene glycol phenyl ether (PGPE), propylene glycol diacetate (PGD), dipropylene glycol dimethyl ether (DGDE), diethylene glycol ethyl ether (DGEE), diethylene glycol methyl ether (DGME), diethylene glycol n-butyl ether (DGBE), diethylene glycol hexyl ether (DGHE), diethylene glycol n-butyl ether acetate (DGBEA), ethylene glycol propyl ether (EGPE), ethylene glycol n-butyl ether (EGBE), ethylene glycol hexyl ether (EGHE), ethylene glycol n-butyl ether acetate (EGBEA), triethylene glycol methyl ether (TGME), triethylene glycol ethyl ether (TGEE), triethylene glycol n-butyl ether (TGBE), ethylene glycol phenyl ether (EGPE) and ethylene glycol n-butyl ether mixtures (EGBEM).

Preferably, the solvent has a surface tension of 20 to 80 dynes/cm, a viscosity of 1 to 30 cP and a density of 0.8 to 1.2 g/cc at ambient temperature. Based on these properties, the solvent is volatilized and removed during curing at about 80 to 300° C.

In addition, the balls 131 are made of an organic compound e.g. divinylbenzene. The balls 131 can be distinguished from other ingredients in that the balls 131 are present in the form of a white powder, while the solid and the solvent are in a liquid state. If necessary, the balls 131 may be subjected to surface-treatment prior to being mixed into the spacer-forming material so that they can be distinguished from other liquid components.

As mentioned above, the case wherein the spacer 130 comprising the balls is formed on the color filter substrate 210 is illustrated in the drawing. Alternatively, the spacer 130 may be formed on the thin film transistor substrate 150. In this case, the arrangement, components and formation method of the spacer 130 are the same as above, except that the spacer 130 is formed on the thin film transistor substrate 120.

Figure 5:
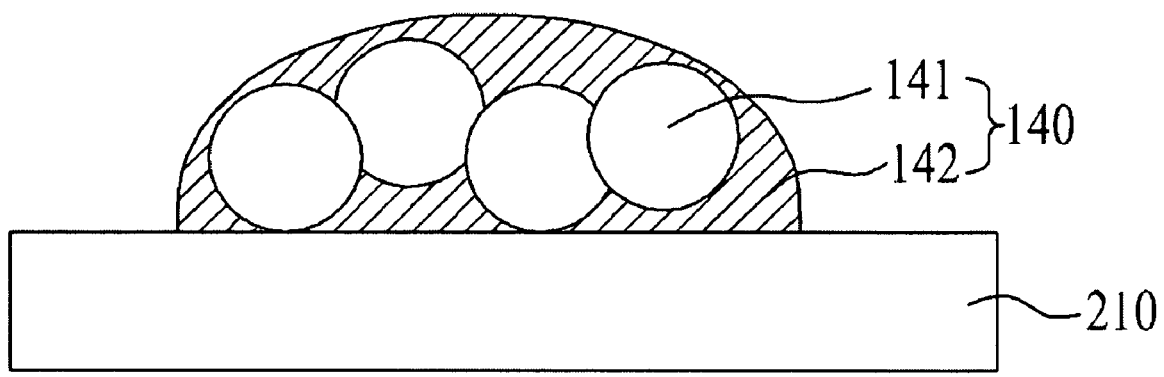
FIG. 5 is a sectional view illustrating an area where a spacer comes in contact with a substrate that faces the same in a liquid crystal display device according to a second embodiment of the present invention.

FIG. 5 is a sectional view illustrating an area where a spacer comes in contact with a substrate that faces the same in a liquid crystal display device according to a second embodiment of the present invention.

As shown in FIG. 5, in the liquid crystal display device of the second embodiment, a spacer 140 is formed on a color filter substrate 210 and comprises a plurality of balls 141 and a solid 142 to aggregate the balls 141 and fix the balls 141 in the form of an oblate spheroid on the color filter substrate 210.

The spacer 140 is formed in accordance with an ink-jetting method, which is performed by jetting a spacer-forming material from an inkjet head (not shown) containing the material in a predetermined position. The spacer-forming material comprises: a liquid material consisting of 2 to 30 wt % of a liquid thermosetting binder, a carbon black and a solvent; and 0.1 to 3 wt % of the balls, with respect to 100 wt % of the total weight of the liquid material. In the process of curing the thermosetting binder and the carbon black into the solid 142, the solvent contained in the spacer-forming material is finally volatilized and removed.

For the liquid crystal display device according to the second embodiment of the present invention, the spacer 140 further comprises carbon black as another component of the solid 142, and the liquid thermosetting binder is present in an amount of 2 to 30 wt %, with respect to the total weight of the spacer-forming material, and in this regard, the content of the liquid thermosetting binder may be lower than that of the first embodiment, more specifically, in the range of 2 to 3 wt %. Aside from these two characteristics, the arrangement and shape of the spacer 130 of the second embodiment are the same as those of the first embodiment. A detailed explanation of the same will be omitted.

In addition, in the second embodiment, the content of the carbon black constituting the spacer-forming material is determined within the range to impart shielding capabilities to the formed spacer 140 and may be controlled depending upon the shielding capability of the carbon black.

Hereinafter, a detailed explanation of the liquid crystal display device with reference to the plan and sectional views will be given.

Figure 6:
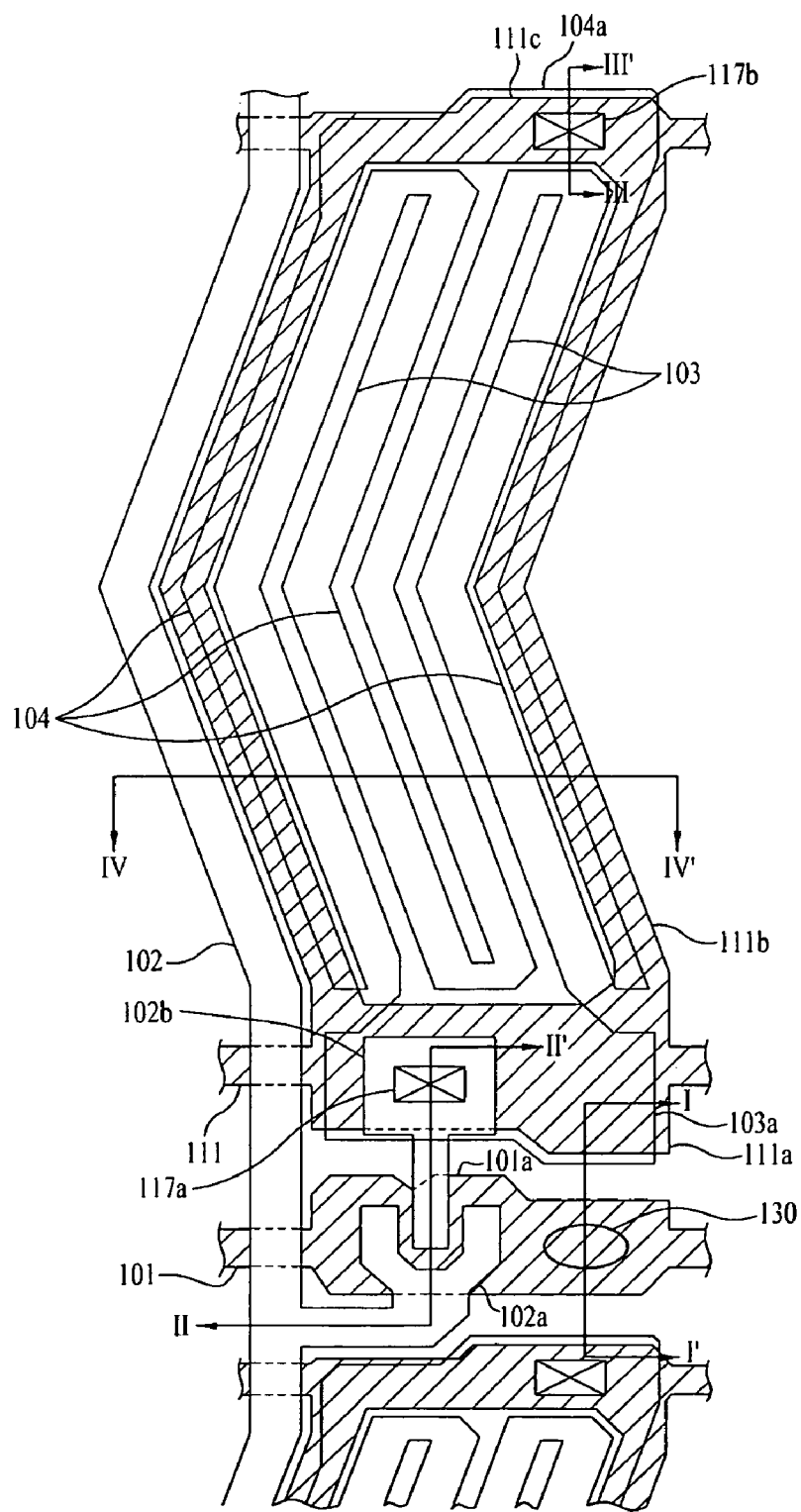
FIG. 6 is a plan view illustrating the liquid crystal display device according to the present invention.
Figure 7:
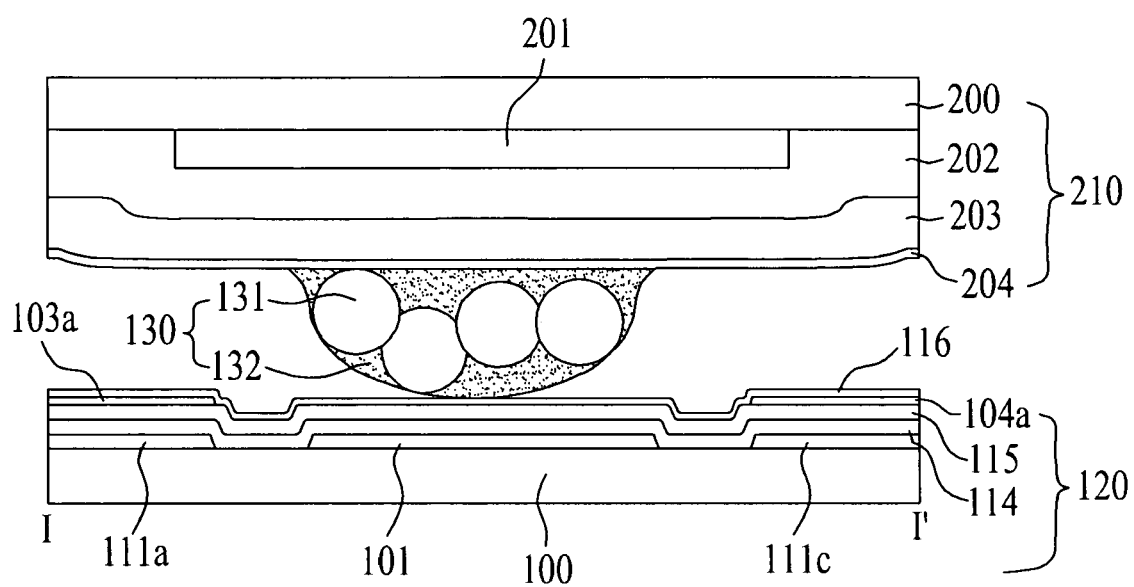
FIG. 7 is a sectional view taken along the line I-I' of FIG. 6.
Figure 8:
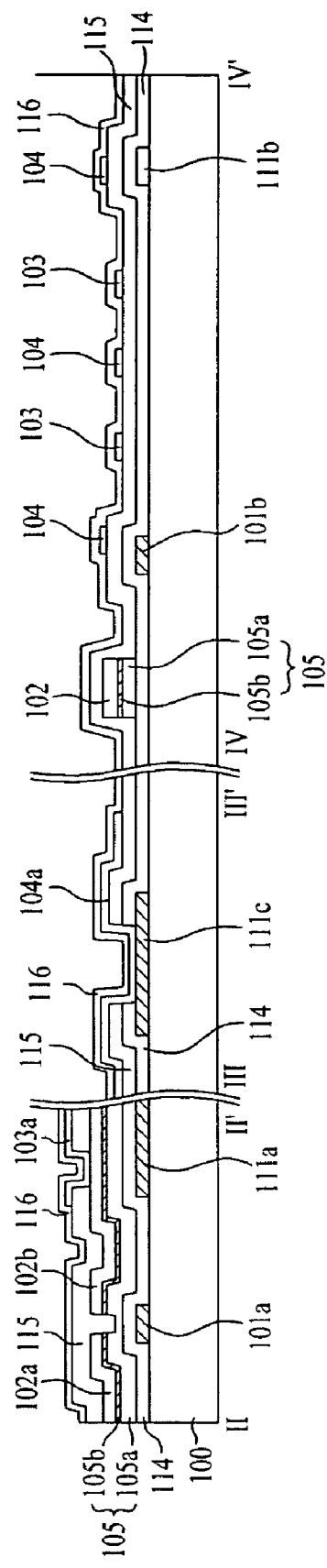
FIG. 8 is a sectional view taken along the lines II-II', III-III' and IV-IV' of FIG. 6.
Figure 9:
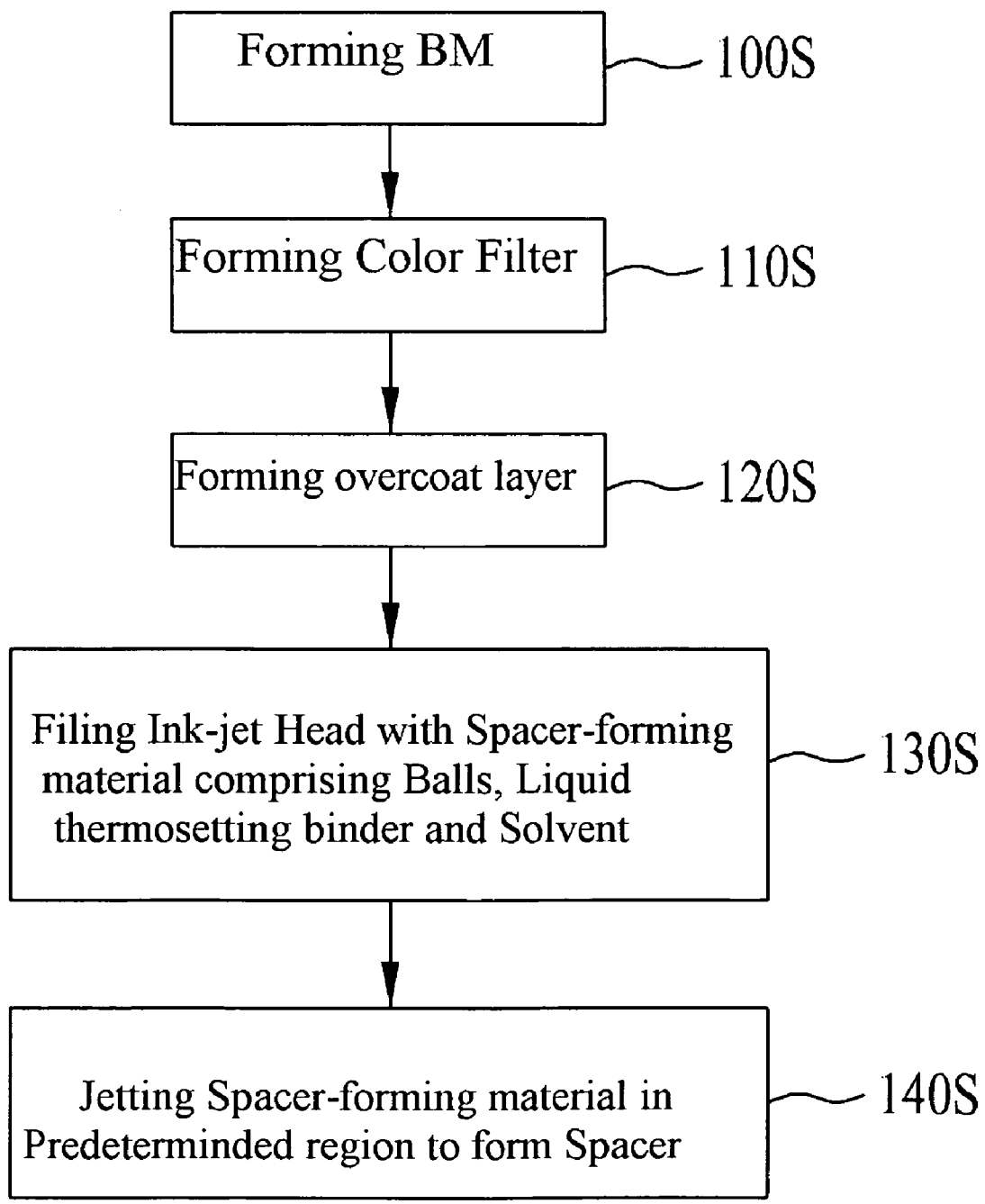
FIG. 9 is a flow chart illustrating a method for forming a second substrate according to the liquid crystal display of the present invention.
Figure 10:
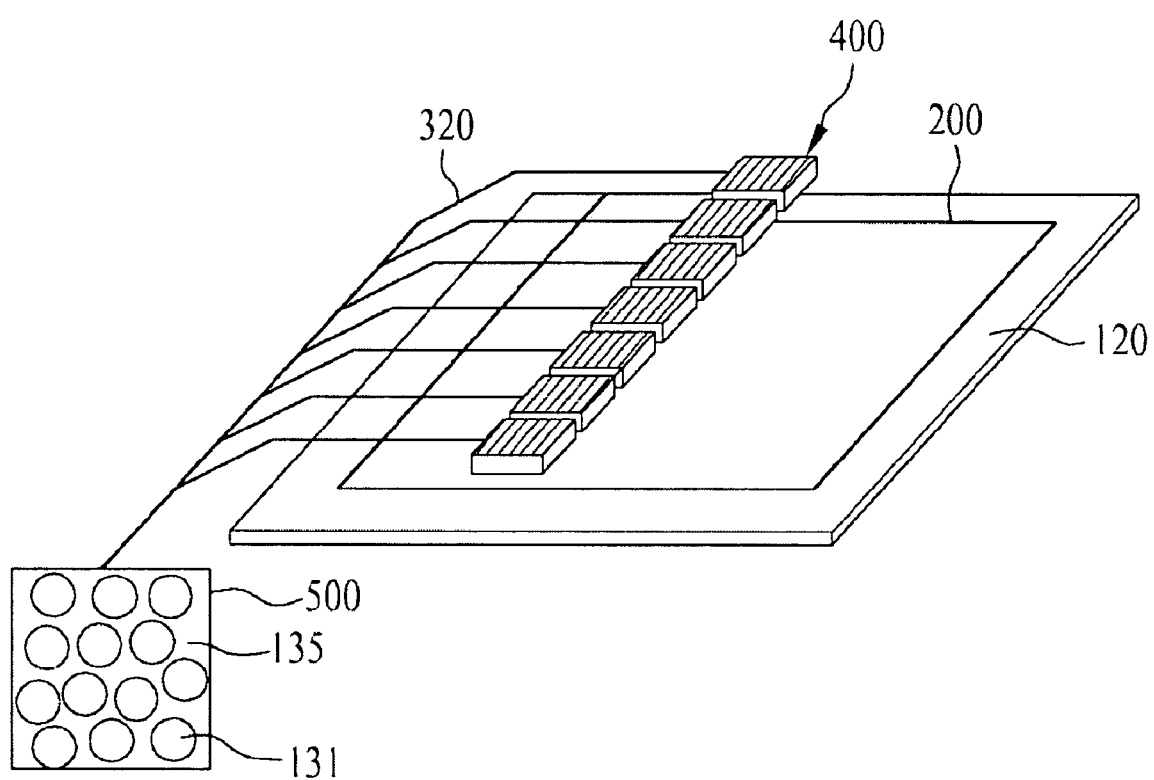
FIG. 10 is a schematic view illustrating an inkjet system used to form the spacer according to the present invention.

FIG. 6 is a plan view illustrating the liquid crystal display device according to the present invention. FIG. 7 is a sectional view taken along the line I-I' of FIG. 6. FIG. 8 is a sectional view taken along the lines II-II', III-III' and IV-IV' of FIG. 6. FIG. 9 is a flow chart illustrating a method for forming a second substrate according to the liquid crystal display of the present invention. FIG. 10 is a schematic view illustrating an inkjet system used to form the spacers according to the present invention.

Hereinafter, the structure provided on the first substrate 100 will be described with reference to FIGS. 6 to 8.

A plurality of gate lines 101 and a plurality of data lines 102 are arranged on a first substrate 100, such that the gate lines 101 and the data lines 102 intersect each other, to define pixel regions. In addition, common lines 111 are arranged on the first substrate 100 such that the common lines extend in parallel to the gate lines 101.

In addition, thin film transistors are located at respective intersections of the data lines 101 and the gate lines 102. Each thin film transistor includes: a gate electrode 101*a* protruding from the associated gate line 101; a gate insulating film 114 formed over the entire surface of the first substrate 100 including the gate electrodes 101*a*, the gate lines 101 and the common lines 111; a "U"-shaped source electrode 102*a* and a drain electrode 102*b* arranged at both sides of the gate electrode 101*a* such that the drain electrode 102*b* is partially located in the "U"-shaped source electrode 102*a*; and semiconductor layers 105 (105*a*, 105*b*) arranged in regions including portions under the source electrode 102*a* and the drain electrode 102*b*, and channel portions between the source electrode 102*a* and the drain electrode 102*b*. The semiconductor layers 105 include an amorphous silicon layer 105*a* and an impurity semiconductor layer (n+ layer) 105*b* arranged thereon. The impurity semiconductor layer 105*b* is formed by removing the channel region present between the source electrode 102*a* and the drain electrode 102*b*. The shape of the source electrode 102*a* is not limited to the "U"-shape and may be "–"- or "L"-shaped.

The data line 102 has a central bent portion at each sub-pixel such that the data line 102 forms a zigzag line. The common line 111 is integrally formed with a storage electrode 111*a* at each pixel and the storage electrode 111*a* is connected to a common electrode connection electrode 111*b* which lies adjacent to both sides of the data line 102 and protrudes in parallel to the data line 102. As mentioned above, the data line 102 crosses the gate line 101 and has a bent portion at each pixel. Exemplary embodiments of the present invention are not limited thereto and the data line may perpendicularly cross the gate line, or may be tilted at a predetermined angle with respect to the gate line. In the illustrated drawings, the reason for imparting the bent portion to the data line 102 at each pixel is that the common electrode 104 and the pixel electrode 103 extend in parallel to the data line, and a vertically symmetrical electric field is thus generated, on the basis of the bent portion, which allows for orientation of liquid crystals in different directions, thus leading to an improvement in viewing angle.

The common electrode 104 and the pixel electrode 103 are formed of transparent electrodes at the same level in each pixel region and have alternately arranged portions. The common electrode 104 is partially overlapped with the common electrode connection electrode 111*b* arranged thereunder. A second common electrode connection electrode 111*c* which extends in parallel to the gate line 101 has, as an electrical contact, a second contact portion 117*b* which passes through the passivation film 115 and the gate insulating film 114 interposed between the common electrode 104 and the second common electrode connection electrode 111*c*.

In addition, the pixel electrode 103 is branched from the second storage electrode 103*a* overlapping the first storage electrode 111*a*, and has, as an electrical contact, a first contact portion 117*a* which passes through the passivation film 115 interposed between the pixel electrode 103 and the drain electrode 102*b*.

Hereinafter, a method for manufacturing the structure provided on the first substrate 100 including the thin film transistors, the common electrodes and the pixel electrodes will be illustrated in detail.

A metal such as Mo, Al or Cr is deposited on a first substrate 100 and is then patterned through photolithographic processes to simultaneously form a plurality of gate lines 101, gate electrodes 101*a*, common lines 111 extending parallel to the gate lines 101, first storage electrodes 111*a* integrally formed with the common lines 111, and first common electrodes 111*b* and second common electrodes 111*c* branched from the first storage electrodes 111*a* and protruded in pixel regions. At this time, each gate electrode 201*a* is formed in a protrusion shape protruded from an associated one of the gate lines 201 in a predetermined position provided by each pixel region, and the first storage electrodes 111*a*, the first common connection electrodes 111*b* and the second common connection electrodes 111*c* are formed in the boundaries between adjacent pixel regions.

Then, an inorganic insulating material is deposited over the first substrate 100 provided with the gate lines 101, the common lines 111, the gate electrodes 101*a*, the first storage electrodes 111*a*, and the first and second common connection electrodes 111*b* and 111*c*, to form a gate insulating film 114.

Subsequently, an amorphous silicon layer 105*a* and an impurity semiconductor layer 105*b* are sequentially deposited on the gate insulating film 114.

A metal such as Mo, Al or Cr is deposited on the resulting structure and a photosensitive film is applied thereto. For example, the photosensitive film may be a negative photosensitive film.

The portions where the data lines, source electrodes and drain electrodes are formed define a light-transmission part, the channel portions of the semiconductor layers define a light-semi-transmission part, and the remaining portions defined a light-shielding part. In this regard, masks (not shown) defined as the light-shielding part are positioned on the photosensitive film.

Subsequently, the photosensitive film is exposed to light and is then developed through the masks, to form a first photosensitive film pattern such that the portions provided by the light-transmission part remain un-etched, the portions provided by the light-semi-transmission part are partially removed, and the portions provided by the light-shielding part are completely removed. The metal material is patterned using the first photosensitive film pattern (not shown) in accordance with photolithographic processes. The first photosensitive film pattern includes a first pattern which has a bent portion in each pixel region, while crossing the gate line 101, and a second pattern (corresponding to the light-transmission part where the source and drain electrodes are formed, including the light-semi-transmission part of the masks) which is connected to the first pattern at the intersection of the gate line 101 and extends toward the pixel region. After the patterning of the metal using the first photosensitive film pattern, data lines 102 which cross the gate lines 101 and have a bent portion at respective pixel regions are formed, and dummy patterns (not shown) connected to the data lines 102 are formed in portions corresponding to the second pattern.

Subsequently, the impurity semiconductor layer 105b and the amorphous silicon layer 105a are primarily selectively removed using the data lines 102 and the dummy patterns as masks.

Subsequently, with respect to the first photosensitive film pattern (not shown), the first photosensitive film pattern is subjected to ashing such that the photosensitive film provided by the light-semi-transmission part of the mask which has a relatively smaller thickness is removed, to form a second photosensitive film pattern (not shown).

Subsequently, the portions, where the metal material (the same layer as the data line 102) of the dummy pattern and the impurity semiconductor layer 105b are exposed, are selectively removed using the second photosensitive film pattern as a mask, to form source electrodes 102a and drain electrodes 102b and to pattern the impurity semiconductor layer 105b arranged thereunder. In this process, the impurity semiconductor layer 105b interposed between the source electrode 102a and the drain electrode 102b is removed. The removed region is defined as a channel portion. The source electrode 102a is formed in the "U" shape that protrudes from the data line 102 toward the pixel region. The drain electrode 102b is spaced apart from the source electrode 102a by a predetermined distance and is partially embedded in the "U" form of the source electrode 102a.

Subsequently, a passivation film 115 is deposited over the gate insulating film 114 provided with the data lines 102, the source electrodes 102a and the drain electrodes 102b. At this time, the passivation film 115 is generally made of an inorganic material e.g., $SiN_x$. In order to increase an aperture ratio of liquid crystal cells, low dielectric organic materials such as benzocyclobutene (BCB), spin on glass (SOG) and acryl may be used.

Subsequently, a portion of the passivation film 115 arranged on the drain electrode 102b is selectively etched to form a first contact portion 117a, and the passivation film 115 and the gate insulating film 114 provided in predetermined portions on the second common connection electrode 111c are selectively removed to form a second contact portion 117b.

Subsequently, a transparent electrode is deposited over the passivation film 115 including the first and second contact portions 117a and 117b and is then selectively removed, to form a plurality of common electrodes 104 which are partially overlapped with the common electrode connection electrodes 111b at respective pixels and spaced apart from one another, third common connection electrodes 104a overlapping the second common connection electrodes 111c and connecting the common electrodes 104 in pixel regions of the common electrodes 104, and a plurality of pixel electrodes 103 alternating with the common electrodes 104. Subsequently, a first alignment film 116 is formed over the entire surface of the passivation film 115 including the pixel electrodes 103 and the common electrodes 104.

Hereinafter, a method for manufacturing the second substrate of the liquid crystal display device will be illustrated with reference to FIGS. 6, 7, 9 and 10.

First, a black matrix layer 201 is formed on the second substrate 200 in a region other than the pixel regions (100S), which serves to shield light of portions corresponding to gate lines, data lines and thin film transistors, other than the pixel regions (100S).

Subsequently, a RGB color filter layer 202 for rendering colors in respective pixel regions are formed (110S).

Subsequently, an overcoat layer 203 is formed over the black matrix layer 201 and the color filter layer 202. (120S).

Subsequently, a second alignment film 204 is formed on the overcoat layer 203.

Subsequently, a spacer-forming material, which comprises a liquid component consisting of a liquid thermosetting binder in an uncured form of a solid 131 and a solvent, and a plurality of balls 131 having a diameter comparable to the cell gap, in an amount of about 3 wt % or less with respect to the total weight of the liquid component, is charged into a supply tank 500 and then supplied to an inkjet head 400 (130S). The liquid component consists of 3 to 30 wt % of the liquid thermosetting binder and the remaining weight of the solvent. Alternatively, the liquid component may consist of 2 to 30 wt % of the liquid thermosetting binder, a small amount of carbon black and the remaining weight of the solvent. As mentioned above, the liquid thermosetting binder includes at least one selected from acrylic-based, urethane-based and epoxy-based organic compounds, or a silicone-based compound. Specific examples thereof are the same as above. In addition, the solvent has a surface tension of 20 to 80 dynes/cm, a viscosity of 1 to 30 cP and a density of 0.8 to 1.2 g/cc at ambient temperature. Based on these properties, the solvent is volatilized and removed during curing at about 80 to 300° C. The balls 131 are made of an organic compound, e.g. divinylbenzene. The balls 131 are surface-coated and are thus prevent without being chemically miscible with other components in the supply tank 500 and the inkjet head.

The spacer-forming material is jetted through the inkjet head 400 in a predetermined portion of the black matrix layer 201 on the second alignment film 204 and then cured to form a spacer 130 (140S). In the process of curing, the solvent is volatilized and removed.

The operation of the inkjet system shown in FIG. 10 will be illustrated in detail below.

First, when a gas, e.g., nitrogen is injected into a supply tank 300 filled with a spacer-forming material wherein balls 131 are mixed with a liquid material 135 consisting of a liquid thermosetting binder and a solvent, the supply tank 300 undergoes an increase in internal pressure, which causes the spacer-forming material present in the supply tank 300 to be supplied through a plurality of pipes 320 into a plurality of inkjet heads 400.

The spacer-forming material supplied into the inkjet head 400 is sprayed through a nozzle (not shown) present inside each inkjet head 400 and is discharged in the predetermined portions of the second alignment film 204 (not shown in FIG. 10) arranged over the black matrix layer 201 (not shown in FIG. 10) on the second substrate 200. In this discharge process, the spacer-forming material has slight spreadability and is oblate, and then cured through a heating process to form a spacer 130.

The pipe 320 is connected with a supply pipe (not shown) in the inkjet head 400. Thus, the spacer-forming material supplied via the pipe 320 flows through the supply pipe in the head 400. At this time, when a voltage applier 480 applies a voltage to a piezoelectric device (not shown), the piezoelectric device undergoes mechanical deformation, thus contracting the passage of the supply pipe and allowing the spacer-forming material to be discharged through the opposite nozzle (not shown).

At this time, at least one of the head 400 and a substrate stage 210 may be moved in a predetermined direction. Accordingly, a second substrate 200 with a large area is provided, the second substrate 200 is divided into portions and ink-jet processes through the heads 400 provided in the ink-jet system are carried out in respective portions.

An example wherein the liquid crystal display device according to the present invention employs an in-plane switching (IPS) mode is illustrated with reference to FIGS. 6 to 8. In the case where the afore-mentioned spacer is applied to TN-mode liquid crystal display devices in which pixel electrodes are formed at respective pixels and common electrodes are further formed on the second substrate, it is possible to obtain the same effects as in the example.

The liquid crystal display device and the method for manufacturing the same have the following advantages.

First, by forming a spacer comprising a plurality of balls, an area in which the spacer comes in contact with a substrate that faces the spacer can be reduced. Of the constituent components of the spacer-forming material, the solid to fix the balls on the substrate is used in a high amount to improve spreadability of the spacer-forming material and to reduce load when the spacer comes in contact with the substrate, as compared to the case where a single ball spacer is used. That is, the ball spacer comes in contact with a substrate that faces the same in an area slightly larger than a dot, and damage of the layer (alignment film) arranged on the substrate can thus be prevented.

Second, the spacer comprises the plurality of balls and a solid to aggregate them, thus preventing movement of the ball-comprising spacer, light leakage and galaxy defects.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a first substrate and a second substrate facing each other;
   a gate line and a data line formed on the first substrate such that the gate line and the data line intersect each other to define a pixel region;
   a black matrix layer formed on the second substrate in a portion corresponding to the gate line and the data line;
   a spacer formed on the first substrate or the second substrate in a predetermined portion provided within the black matrix layer, the spacer comprising a plurality of balls and a solid to aggregate the balls together and cover the surfaces of the balls; and
   a liquid crystal layer filled between the first substrate and the second substrate.

2. The liquid crystal display device according to claim 1, wherein the solid includes at least one selected from acrylic-based, urethane-based and epoxy-based organic compounds.

3. The liquid crystal display device according to claim 2, wherein the acrylic-based organic compound includes ethyl methacrylate, N-butyl methacrylate, isobutyl methacrylate, dicyclopentanyl methacrylate, benzyl methacrylate, glycidyl methacrylate, 2-hydroxyethyl methacrylate, methacrylic acid isobornyl methacrylate and styrene polymers, and combinations thereof.

4. The liquid crystal display device according to claim 1, wherein the solid includes a silicone compound.

5. The liquid crystal display device according to claim 1, wherein the solid of the spacer comes in contact with the first substrate or the second substrate at an angle of 20 to 50 degrees.

6. The liquid crystal display device according to claim 1, wherein the spacer is formed by heating a spacer-forming material, comprising a liquid material consisting of 3 to 30 wt % of a liquid thermosetting binder and a solvent, and 0.1 to 3.0 wt % of the balls, with respect to the total weight of the liquid material, to volatilize the solvent and to cure the remaining components.

7. The liquid crystal display device according to claim 1, wherein the spacer is formed by heating a spacer-forming material, comprising a liquid material consisting of 2 to 30 wt % of a liquid thermosetting binder, carbon black and a solvent, and 0.1 to 3.0 wt % of the balls, with respect to the total weight of the liquid material, to volatilize the solvent and to cure the remaining components.

8. A method for manufacturing a liquid crystal display device comprising:
   preparing a first substrate and a second substrate;
   forming a gate line and a data line on the first substrate such that the gate line and the data line intersect each other to define a pixel region;
   forming a black matrix layer on the second substrate in a portion corresponding to the gate line and the data line;
   inkjetting a spacer-forming material, comprising a plurality of balls and a liquid material consisting of a liquid thermosetting binder and a solvent, in a portion provided above the black matrix layer on the first substrate or the second substrate, and heating the spacer-forming material to volatilize the solvent and cure the liquid thermosetting binder to aggregate the balls together and cover the upper surfaces of the balls, to form a spacer; and
   forming a liquid crystal layer between the first substrate and the second substrate and joining the first substrate to the second substrate.

9. The method according to claim 8, wherein the process of ink-jetting the spacer-forming material is carried out such that the spacer-forming material comes in contact with the first substrate or the second substrate at an angle of 20 to 50 degrees.

10. The method according to claim 8, wherein the spacer-forming material comprises a liquid material consisting of 3 to 30 wt % of a liquid thermosetting binder and a solvent, and 0.1 to 3.0 wt % of the balls, with respect to the total weight of the liquid material.

11. The method according to claim 8, wherein the spacer-forming material comprises a liquid material consisting of 2 to 30 wt % of a liquid thermosetting binder and a solvent, and 0.1 to 3.0 wt % of the balls, with respect to the total weight of the liquid material.

12. The method according to claim 8, wherein in the process of forming the spacer, the curing temperature is 80 to 300° C.

13. The method according to claim 8, wherein the solvent has a boiling point of 60 to 300° C.

14. The method according to claim 13, wherein the solvent is a glycol ether.

* * * * *